US 6,669,381 B2

(12) United States Patent
Staller et al.

(10) Patent No.: US 6,669,381 B2
(45) Date of Patent: Dec. 30, 2003

(54) ACTUATOR AND SELECTOR MECHANISM FOR COMPACT CAMERA

(75) Inventors: Norman D. Staller, Beverly, MA (US); Nobuhiko Togashi, Simotsugagun (JP); Kazumi Sekiguchi, Simotsugagun (JP); Toshiharu Kurakowa, Simotsugagun (JP); Susumu Hasegawa, Simotsugagun (JP)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/952,670

(22) Filed: Sep. 14, 2001

(65) Prior Publication Data

US 2002/0090219 A1 Jul. 11, 2002

Related U.S. Application Data

(60) Provisional application No. 60/233,005, filed on Sep. 15, 2000.

(51) Int. Cl.$^7$ .............................. G03B 9/00; G03B 9/08; G03B 17/38; G03B 17/00
(52) U.S. Cl. ....................... 396/443; 396/450; 396/459; 396/502; 396/543
(58) Field of Search ................................. 396/443, 450, 396/459, 502, 505, 263, 543, 299, 297, 6

(56) References Cited

U.S. PATENT DOCUMENTS

| | | | |
|---|---|---|---|
| 3,839,607 A | 10/1974 | Ogilhara | 200/33 R |
| 4,269,492 A | * 5/1981 | Engelsmann et al. | 396/299 |
| 5,867,742 A | 2/1999 | Salvas et al. | 396/263 |
| 5,870,633 A | 2/1999 | Norris | 396/33 |
| 6,099,172 A | 8/2000 | Togashi | 396/502 |

* cited by examiner

Primary Examiner—Russell Adams
Assistant Examiner—Rochelle Blackman

(57) ABSTRACT

Disclosed herein is a camera having a shutter mechanism; actuating means for actuating the shutter mechanism; and, an aperture selecting assembly that is movable from an initial mode position to at least a first mode position. Also disclosed is an aperture selector assembly that is coupled to the shutter actuating mechanism and includes a slide that is selectively movable from an initial mode position to one of a plurality of aperture selecting positions. During slide movement to the desired aperture setting, the strobe is energized and the energy to operate the shutter is stored in a spring. At the desired position, the selector slide is detented by a first clasping device until a shutter button is actuated for releasing the shutter and firing the strobe. A second clasping device becomes operative during shutter actuation to hold the slide in position even though the detent of the first clasping device has been released.

10 Claims, 19 Drawing Sheets

ACTUATOR AND SELECTOR MECHANISM FOR COMPACT CAMERA

CROSS-REFERENCE TO RELATED APPLICATIONS

The present application claims priority to provisional application Ser. No. 60/233,005, filed Sep. 15, 2000. The present application is related to copending provisional patent application filed in the United States Patent and Trademark Office on Aug. 9, 2000, having Ser. No. 60/223,958 and entitled "Compact Photographic Camera"; and, copending patent application Ser. No. 09/952,549 entitled "Compact Photographic Apparatus of the Self-Developing Type" filed in the United States Patent and Trademark Office on even date herewith.

BACKGROUND OF THE INVENTION

The present invention relates generally to compact photographic apparatus and, more particularly, to compact cameras that have simplified selectors and actuators for performing multiple camera functions in combination with other camera elements in regard to self-developing imaging apparatus.

The prior art is characterized by numerous efforts to make photographic cameras simplified and compact not only in terms of their construction, but their operation as well. In addition, such efforts have included approaches for ensuring that an operator, especially younger ones, need not be unduly concerned with the camera operations both prior to and following exposure. In further addition, efforts have been undertaken to make construction of the cameras economical. Known approaches include those self-developing photographic cameras as described in U.S. Pat. No. 5,870,633 issued to Norris and U.S. Pat. No. 6,099,172 issued to Togashi et al.; both of which are commonly-assigned to Polaroid Corporation.

Furthermore, the prior art is characterized by numerous efforts to make photographic cameras of the self-developing type simplified and compact with respect to user interfaces relating to selections of different camera modes, such as aperture, exposure and illumination. Examples of known approaches in this area are described, for example, in U.S. Pat. No. 3,839,607 issued to Ogihara; and U.S. Pat. No. 5,867,742 issued to Salvas et al. The latter patent describes a manual selector that is movable from an initial mode position to anyone of a plurality of discrete mode setting positions, whereby the selector is also operable for actuating a strobe unit in some of the selected modes. This patent describes means for automatically returning the manual selector to the initial mode position following a camera operating cycle. Commonly-owned U.S. Pat. No. 6,099,172 relates to a simplified mechanism for selecting apertures to different camera modes of operation, as well as effecting shattering operations, and automatic return of the components to an original or unactuated condition. The latter patent describes such a mechanism for use in a commercially successful camera particularly adapted to a self-developing film frame removed manually from the camera following exposure, with such withdrawal effecting processing of the exposed film unit, indexing of a subsequent film unit, and singulation of the pulled unit.

Despite the existence of these known approaches, however, there is nevertheless a continuing desire to make improvements in the overall ease and reliability of their operation as well as simplification and compactness of the camera construction, while not sacrificing system performance.

SUMMARY OF THE INVENTION

According to the principles of the present invention provision is made for a camera having a shutter mechanism; actuating means for actuating the shutter mechanism; and, an aperture selecting assembly that is movable from an initial mode position to at least a first mode position in response to manipulation thereof for setting at least one exposure aperture. The actuating means includes a finger engageable portion that is biased to a first position and when depressed by a force applied thereto is movable to a second position for actuating the shutter mechanism. Provision is made for an aperture selector assembly coupled to the shutter actuating mechanism and includes a slide that is selectively movable from an initial mode position to one of a plurality of aperture selecting positions. During slide movement to the desired aperture setting condition the strobe is energized and the energy to operate the shutter is stored in a spring. At the desired position, the selector slide is detented by a first clasping device until a shutter button is actuated for releasing the shutter and firing the strobe. A second clasping device becomes operative during shutter actuation to hold the slide in position even though the detent of the first clasping device has been released. The slide is automatically returnable to its original position following exposure by the operator removing pressure from the shutter button and turning off the power to the strobe to preserve battery life.

OBJECTS OF THE PRESENT INVENTION

It is an object of the present invention to provide a camera of the self-developing type that is compact in its architecture and simplified in operation.

It is an object of the present invention to provide a camera of the self-developing type that has a compact architecture and yet is highly reliable in operation.

It is an object of the present invention to provide a camera of the self-developing type that has a compact architecture and yet is highly reliable in operation without any loss in performance.

It is an object of the present invention to provide a camera of the self-developing type that has a compact architecture and yet is relatively economical to manufacture and assemble.

It is an object of the present invention to provide for a simplified camera that is user friendly and reliable in operation; particularly for young and inexperienced camera operators.

It is an object of the present invention to provide for a simplified camera of the above type that returns the selector automatically to an initial mode setting position.

It is an object of the present invention to provide a camera having mechanisms for selecting camera modes and actuators that are operable for actuating multiple camera functions including aperture selection, shattering, and strobe firing.

It is an object of the present invention to provide for a camera having a selector that is manually displaceable for selecting multiple camera modes by having selector move from an initial mode setting position to any one of a plurality of operating mode positions, and subsequently returning automatically to the initial mode setting position following shutter operation.

Other objects and further scope of applicability of the present invention will become apparent after reading a detailed description when taken in conjunction with the accompanying drawings wherein like reference numerals indicate like structure throughout the several views.

DETAILED DESCRIPTION

Figure 1:
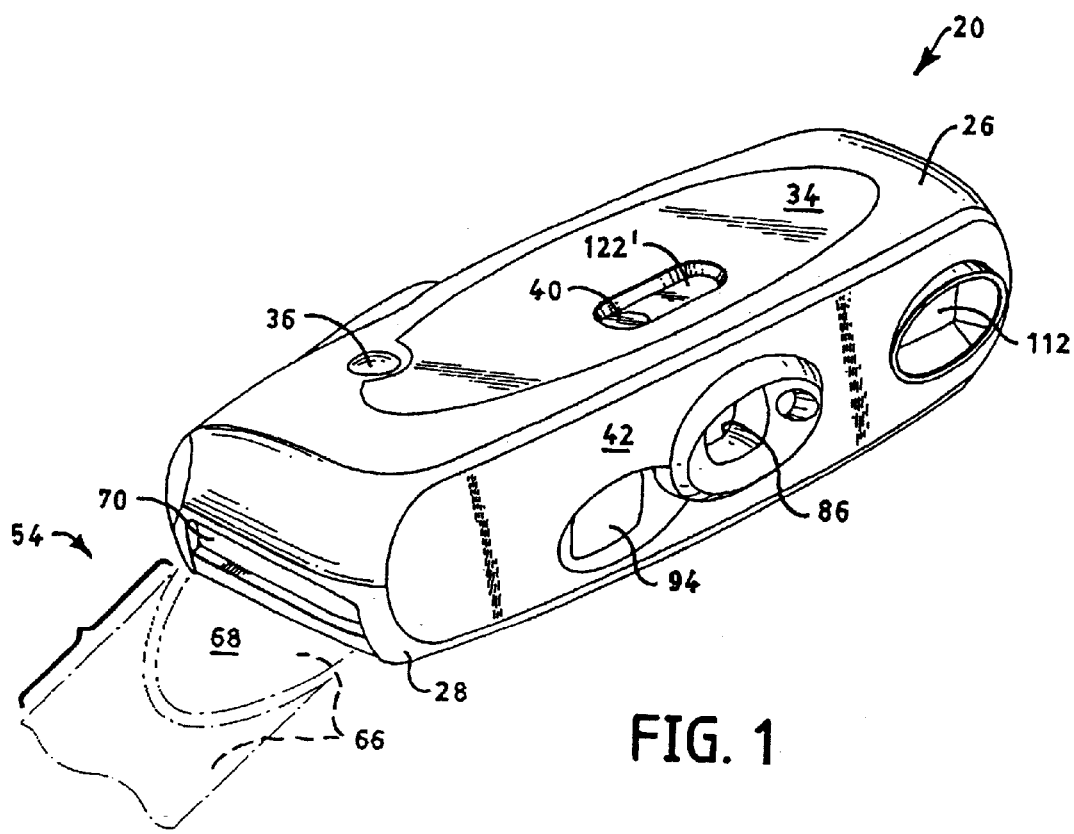
FIG. 1 is a perspective view of a self-developing camera embodying features of the present invention.
Figure 2:
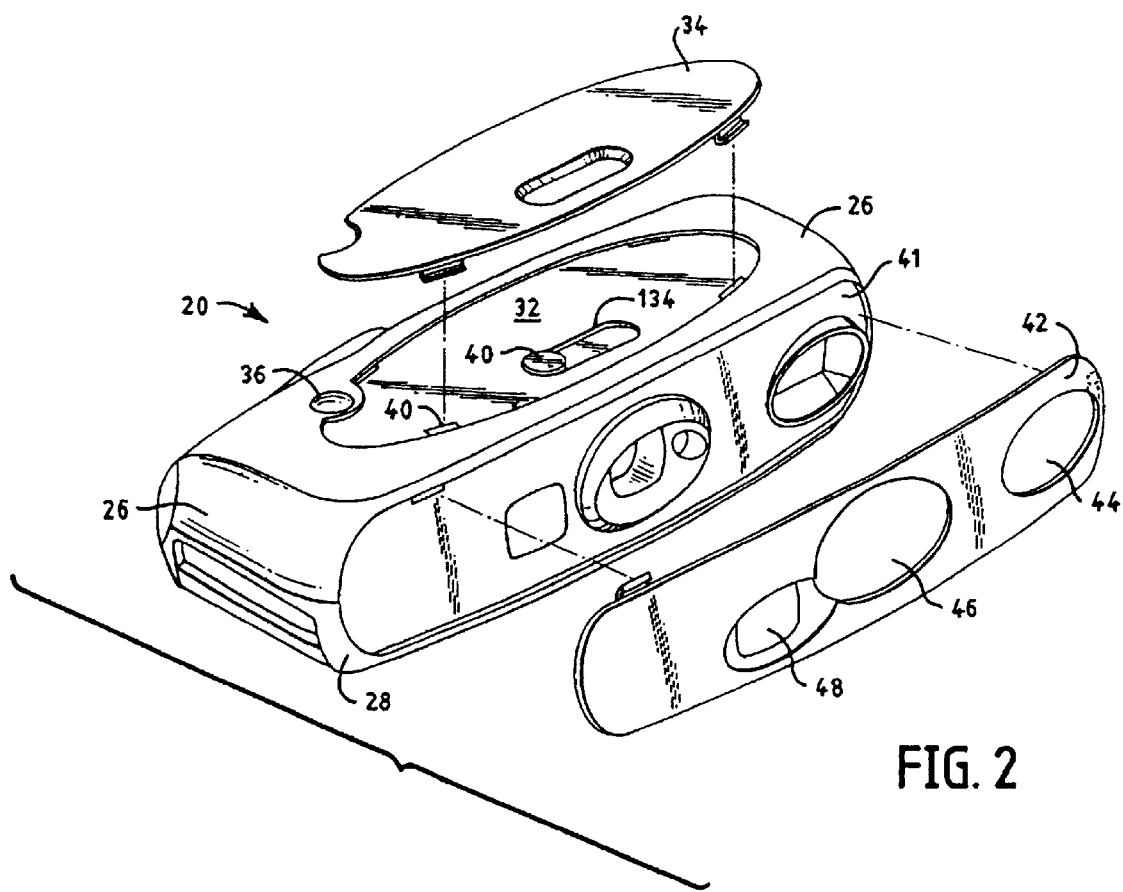
FIG. 2 is a partially exploded perspective view of the camera illustrating removable and decorative panels.
Figure 3:
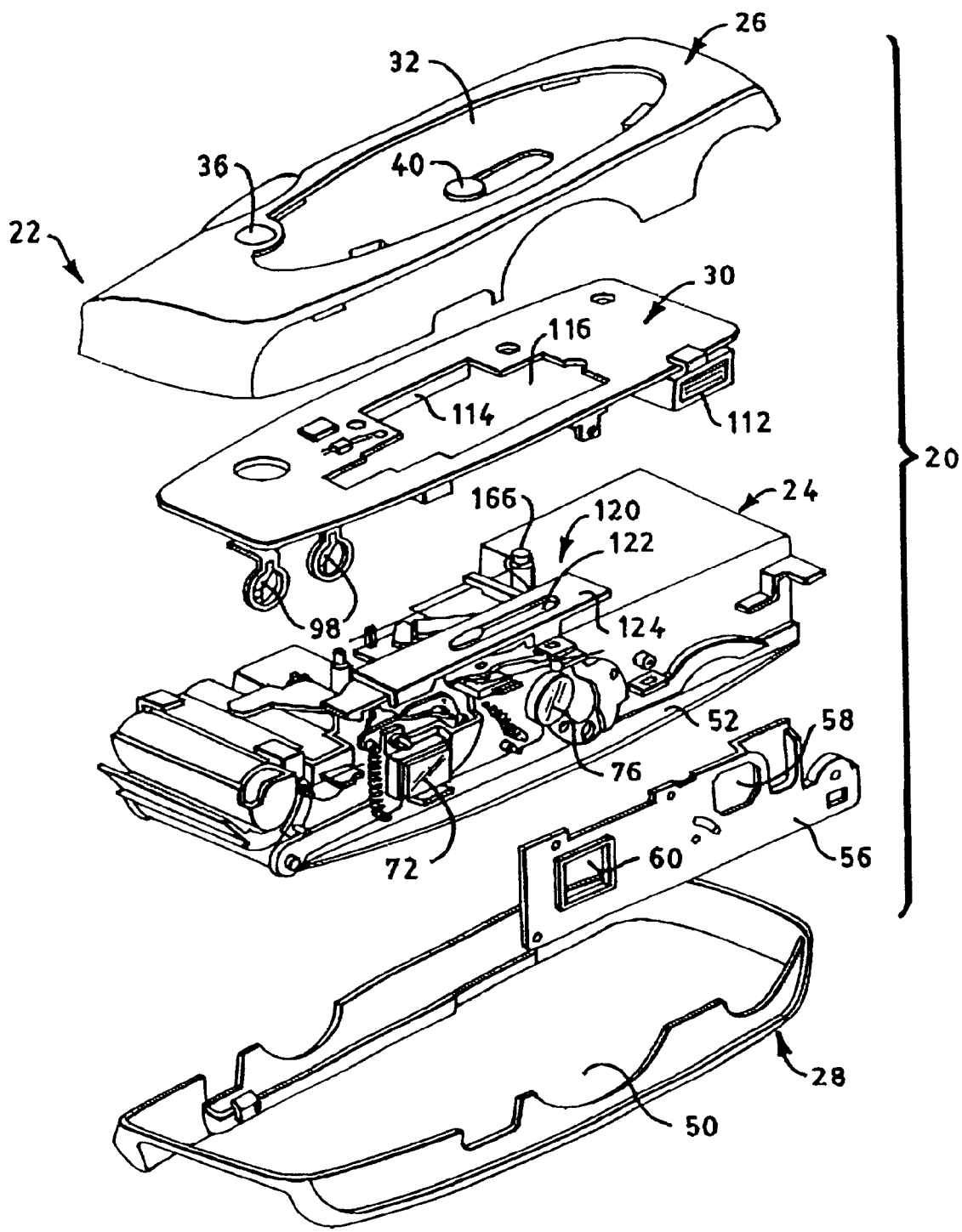
FIG. 3 is an exploded perspective view illustrating several subassemblies of the camera.

Reference is made to FIGS. 1–6 for illustrating one preferred embodiment of a compact camera 20 of the self-developing type that is made in accordance to the principles of the present invention. Included in the camera 20 is a light-tight housing assembly 22 that essentially comprises a main frame assembly 24, an upper casing shell or member 26, a lower casing shell or member 28, and an electrical strobe board 30 that carries the electrical components for operation of the camera.

The upper casing member 26 defines an elliptical recess 32 for accommodating in a generally flush relationship thereto a decorative and removable top panel 34 that a user can replace in order to change styling of the camera. The decorative top panel 34 is latched to the upper casing. The upper casing 26 has an opening for accommodating a shutter button 36 and an elongated slot 38 for an aperture selector tab 40.

The upper and lower casing members are suitably joined together to enclose the main frame assembly 24 and define an elliptical recess 41 in the front thereof for accommodating a decorative and replaceable front panel 42. The front panel 42 is latched to the housing assembly 22 so as to fit generally flush within the recess 41. The front panel 42 has a strobe opening 44, a taking lens opening 46, and a viewfinder opening 48.

The lower casing member 28 has an enlarged generally rectangular opening 50 sized for allowing a film loading door 52 to move pivotally between open and closed conditions. As a consequence, a film assembly is allowed to be inserted and removed.

Provision is made for a generally rectangular retaining plate 56 that has a taking lens aperture 58 and a viewfinder aperture 60 that is mounted on the main frame assembly 24 and is enclosed within the casing members 26, 28.

Reference is made back to the main frame assembly 24, wherein provision is made for a film box cavity 62 that is sized for removably receiving a film package (not shown) that stores the film assemblage 54 in a light-tight relationship. By virtue of such a condition being achieved, it is possible to make the surrounding upper and lower casing members of a transparent material without the risk of damaging the film. The film assemblage 54 is, preferably, of the self-developing kind that is particularly adapted for use in a camera of the above type. The film assemblage is similar in construction to those described in commonly-assigned U.S. Pat. Nos.: 5,838,999 and 5,888,693, and hence, the descriptions thereof are incorporated herein and made a part hereof. However, only those portions of the film assemblage 54 necessary to understand the present invention will be set forth herein. In this regard, the film assemblage is in the form of an elongated strip 64 with separable individual film frames 66 housed in a folded and stacked relationship within the film package or cassette. A leading tab 68 of each frame 66 is adapted to protrude from an exit slot 70 (FIG. 4) and a spring-biased film flap 72 is pivotally mounted adjacent one end of the camera housing, whereby an operator can grasp and pull the film assemblage for indexing the latter.

Figure 4:
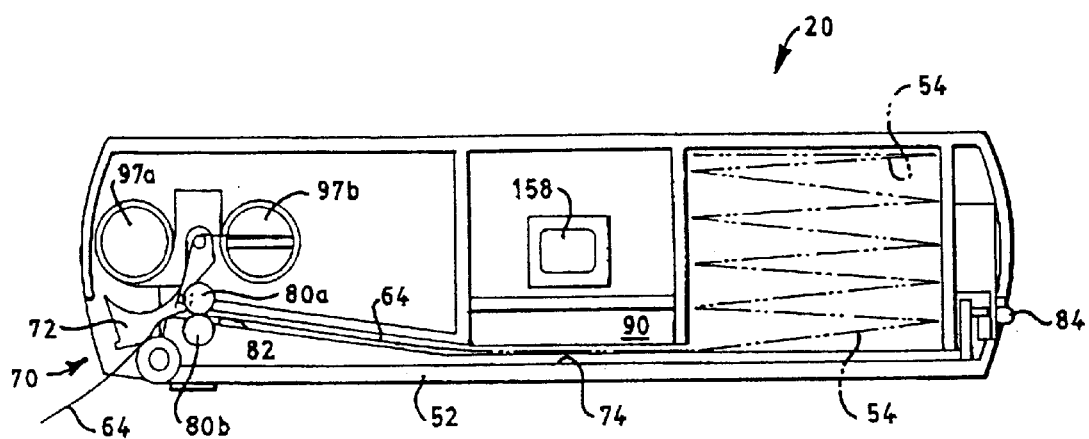
FIG. 4 is a schematic elevation view illustrating several of the operating components in the interior of the camera.

The film flap does not, per se, form an aspect of the present invention. A detailed description thereof is described in the last noted patent application and is incorporated herein and made a part hereof. The film frames 66 are frangibly connected to each other, whereby they separate into individual frames when the film strip is pulled from the housing assembly. Thus, when an operator pulls on a leading tab 68 of an exposed film frame, the film is advanced thereby effecting processing of an exposed film unit as the latter is withdrawn from a focal plane 74 and passes through a nip defined by a pair of processing rollers 80a, b (FIG. 4). As a result, each of the emerging and distal end film frames separate from a successive film frame that has been simultaneously indexed from the film cavity which has its leading tab emerge.

Figure 5:
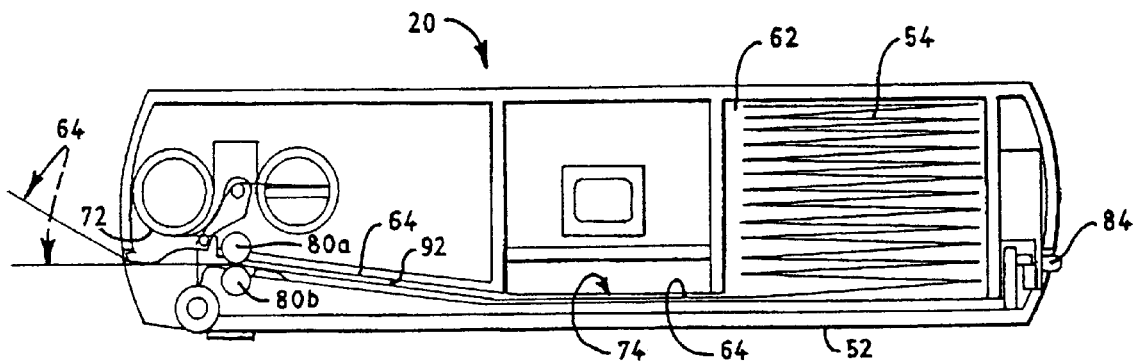
FIG. 5 is a schematic elevation view illustrating several of the operating components of the interior of the camera.
Figure 6:
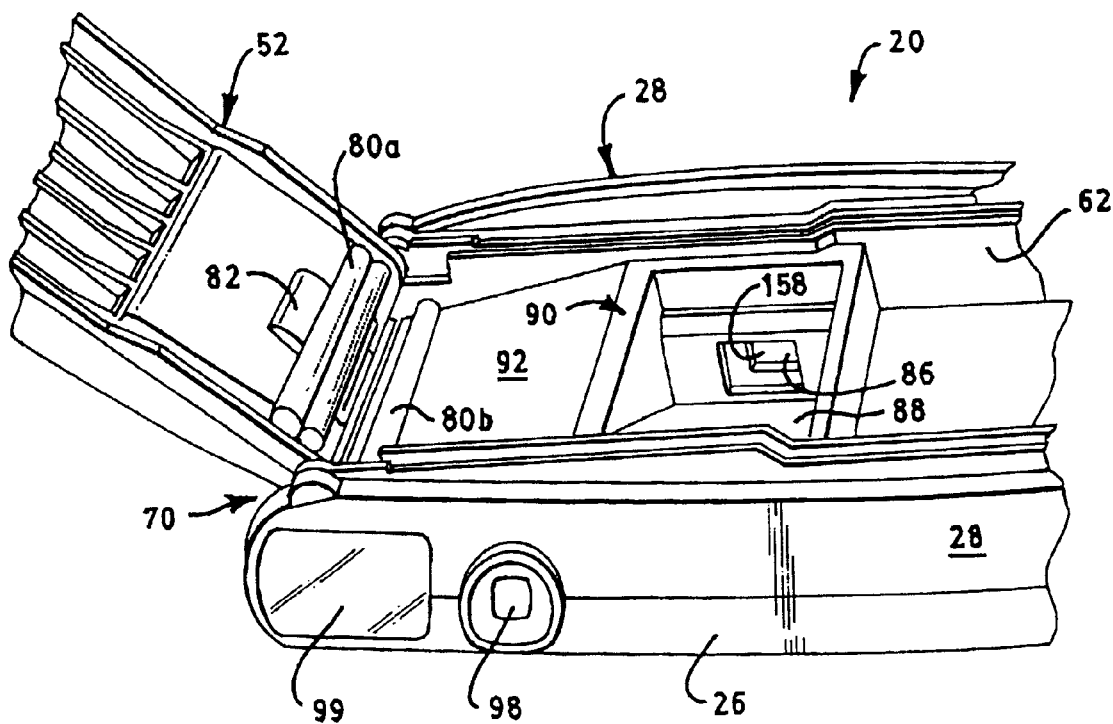
FIG. 6 is a perspective view of a partial portion of the camera of the camera in the open film loading condition.

Continued reference is to FIGS. 4–6 wherein the film loading door 52 is pivotally mounted to one end of the main frame housing assembly 24 adjacent a film flap 72. The spread roller 80a is mounted for rotation on the door 52 adjacent a pre-spread feature 82 that is mounted on the door immediately prior to a nip defined by and between the rollers 80a and 80b. A latch 84 is located at one end of the film loading door 52 and cooperates with a complementary catch for releaseably securing the door in a closed relationship with the main frame assembly. A more complete description this structure is found in commonly filed patent application (Case 8453Pro) noted above which is incorporated herein and made a part hereof. The camera is also envisioned to be a one-time use camera, whereby the door would be locked against customer opening and the film preloaded prior to being locked.

For defining the focal plane 74 there is provided a taking lens 86, a mirror 88, and a focal cone 90 defined by and at the bottom of the main housing assembly 24. The taking lens 86 is mounted by the retaining plate and is generally positioned to reduce the height of camera relative to, for example, the camera described in U.S. Pat. No. 6,099,172. The taking lens 86 is positioned more laterally with respect to a longitudinal axis of the camera while retaining the same focal length as the taking lens in the noted patent. This relationship in turn lowers the mirror, thus reducing the height profile. The focal cone 90 is defined to accommodate the size format of the film. Adjacent the focal cone 90 is a film path defining ramp 92 that serves to reduce the height of the camera. The spread roller 80b is spring biased and is mounted for rotation in the bottom wall of the main frame assembly 24. The spread roller 80b defines a nip with roller 80a whenever the loading door is in the closed condition. One viewfinder lens 94 of the viewfinder assembly 96 is retained by the retaining plate 46. The viewfinder assembly 96 can be anyone of several kinds.

As illustrated, a pair of generally parallel battery receiving cavities 97a, 97b are mounted in close proximity to the viewfinder assembly 96 and the shutter button 36. The battery receiving cavities lie in a plane that includes the viewfinder assembly 96 for purposes of establishing a compact relationship. Batteries (not shown) engage with the battery contacts 98. A battery compartment door 99 is provided.

A flash tube assembly 112 of any suitable type is mounted on the strobe board 30 as illustrated for use in generating pulses of artificial illumination directed at the scene. A capacitor 114 is provided for energizing the flash tube assembly 112 and is mounted on an underside surface of the strobe board 30 with its axial length extending along a bottom surface of the strobe board and generally parallel to such bottom surface.

The horizontally mounted strobe board 30 has an aperture 116 that is configured and sized to fit over and surround the periphery of an aperture selector mechanism 120 made according to the principles of the present invention. The aperture 116 also encloses a top portion of the mirror housing, thereby lowering the overall height of the camera. Included in the aperture selector mechanism 120 is an elongated aperture selector slide 122 that is mounted for slidable movement on the main frame assembly 24 and is otherwise manually displaceable by an operator to one of several distinct aperture settings corresponding to, for example, iconographic information or symbols (not shown) on the exterior of the housing. The aperture selector slide 122 is housed and guided for movement by a slide retainer housing 124; both of which have their longitudinal axes generally parallel to each other and a top surface of the strobe board 30. The slide and its retainer are generally centrally disposed along the length of the camera and are positioned to be above the taking lens.

Figure 7:
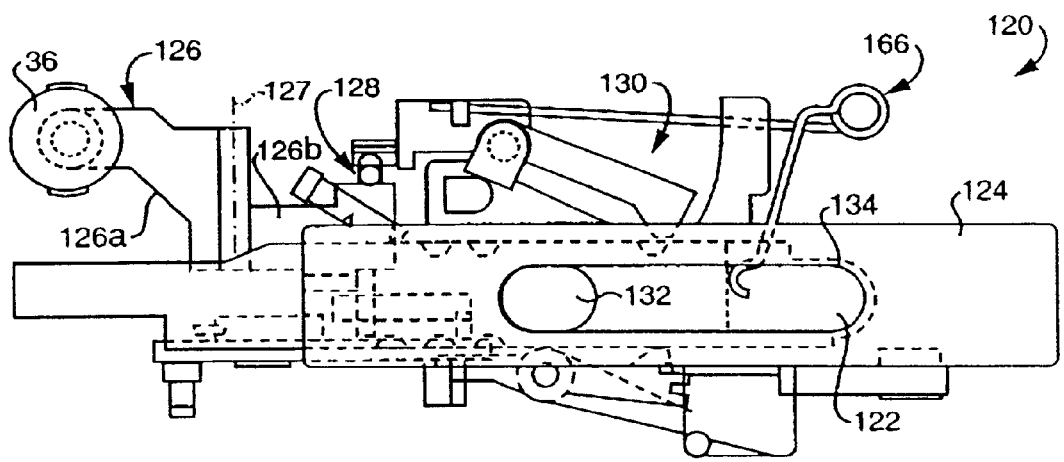
FIG. 7 is a plan view of the components of the aperture and shutter mechanism of the present invention in one condition.
Figure 8:
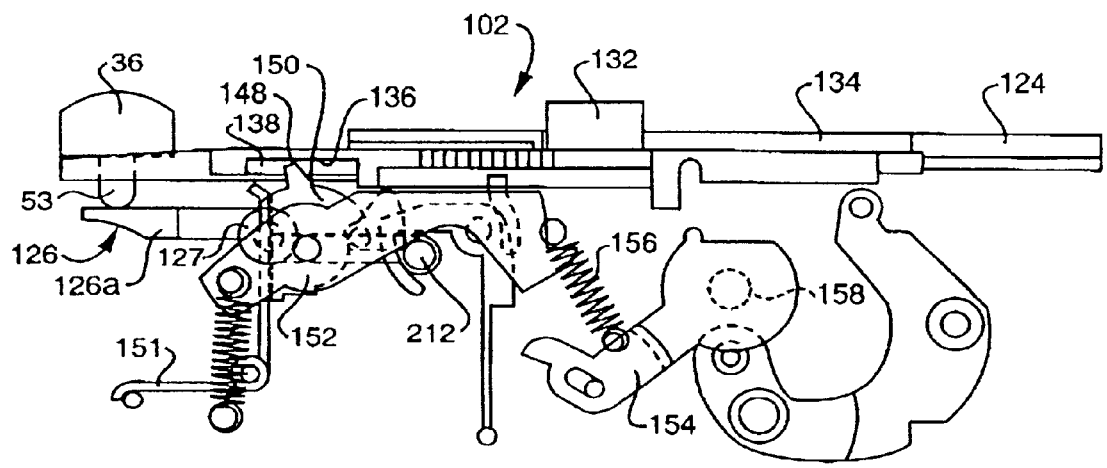
FIG. 8 is an elevation view of the components depicted in FIG. 7.

Reference is initially made to FIGS. 7 and 8 for illustrating an improved shutter and aperture selector assembly or mechanism 120 in a rest or "OFF" condition. A shutter link 126 has a wing portion 126a that is engaged by a plunger 53 on the shutter button 36. The shutter link 126 is pivoted about an axis 127 and has another wing portion 126b with a cam 128 at a distal end thereof. The cam 128 engages a complementary surface on a clasping or detenting mechanism 130 for reasons to be described hereinafter. It will be further appreciated that the clasp can only engage and stop the slide when it the former is in one of the notches. If the clasp engages at any location other than the notches the shutter is prevented from further operation.

The aperture selector assembly 120 includes an elongated and generally flat aperture selector slide 122 that is partially enclosed by aperture selector slide retainer 124. The slide 122 is mounted on tracks, not shown, on the main housing assembly for allowing its reciprocal movement. A protrusion 132 protrudes upwardly from the slide 122 and is free to travel in an axial direction in an elongated slot 134 formed in the slide retainer 124. The protrusion 132 cooperates with the aperture selector tab 132 that protrudes through a corresponding slot in the plate 34 for allowing a user to displace the slide from its "off" position (FIGS. 7&8) to the one of three distinct settings (not shown) corresponding to "indoor"; "sunny" or "partly cloudy" conditions. The slide 122 has an elongated cut-out 136 located on a bottom surface and positioned adjacent one lateral side thereof for defining a hook or shoulder 138 that is adapted to cooperate with a radially protruding hammer tab 148 of a rotatable hammer bypass device 150.

A shutter hammer 152 is mounted for rotation on the same axis as the bypass device 150 and is adapted to be driven by the latter. However, the hammer 152 moves independently of the hammer bypass 150 for reasons to be made evident.

The hammer 152 is shown in a non-cocked or raised condition for either its first exposure or following a previously completed exposure. As will be described, the hammer 152 when actuated is adapted to trip a shutter blade 154. The shutter blade 154 is spring biased by a shutter spring 156 to a scene light blocking or closed position covering aperture 158 of the taking lens.

Figure 9:
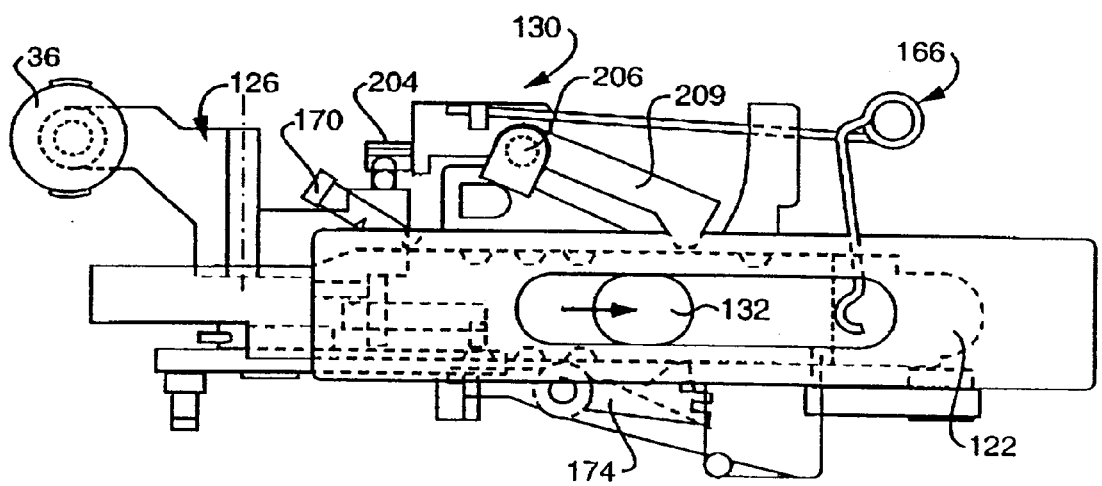
FIG. 9 is a plan view of the operating components of the aperture and shutter mechanism of the present invention in a different operating condition.
Figure 10:
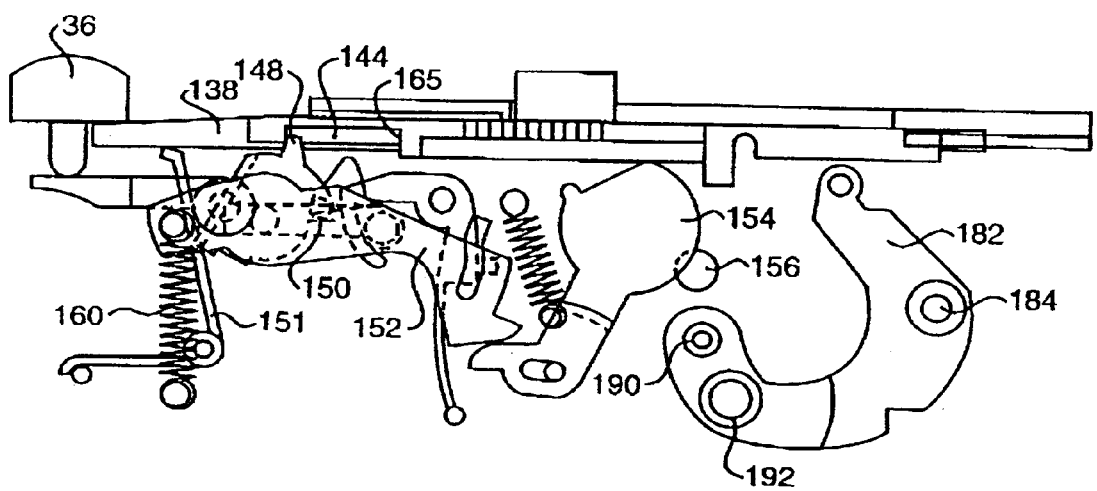
FIG. 10 is an elevation view of the components depicted in FIG. 9.

FIGS. 9 & 10 illustrate the aperture selector slide 122 in a position after it has been displaced by an operator, from it rest condition (FIGS. 7 & 8) towards a desired aperture setting condition; but before it arrives the aperture setting condition. During this early phase of displacement, the shoulder 138 drivingly engages the tab 148 for rotating the bypass device 150, against a spring bias by a spring 151 (FIG. 10) that has an arm portion thereof engaging a surface of the device. Since the bypass device 150 is in engagement with a pin on the side of the hammer 152, the latter is likewise rotationally displaced to its cocked condition (see FIGS. 12 and 14). The hammer when so driven stretches a hammer spring 160 attached at one end thereof for providing energy for operating the shutter. The hammer is latched in its cocked condition (FIGS. 11 & 12) when a portion 162 thereof engages a surface on a flexibly resilient hammer latch 164 in the same manner as described in the last noted patent. It will be noted that if the user decides not to take an exposure after cocking the hammer, the slide 122 can be moved back to its original or "off" position without requiring a firing of the shutter. This can happen since the bypass 150 is independently rotatably with respect to the hammer in the opposite direction. Toward this end, a shoulder 145 on the cut-out 144 can override the tab 148 when returning because the bypass is independently rotatable with respect to the hammer. It will be noted that the slide 122 returns automatically to the original position under the influence of a clasp spring 166 mounted on the main frame assembly 24 as will be described.

Figure 11:
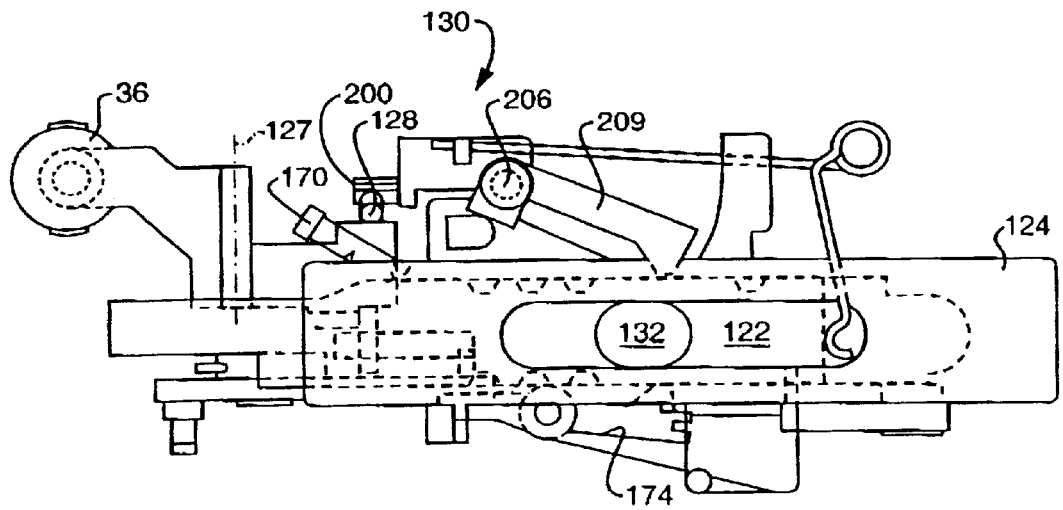
FIG. 11 is a plan view of the operating components of the aperture and shutter mechanism of the present invention in a still further different operating condition.
Figure 13:
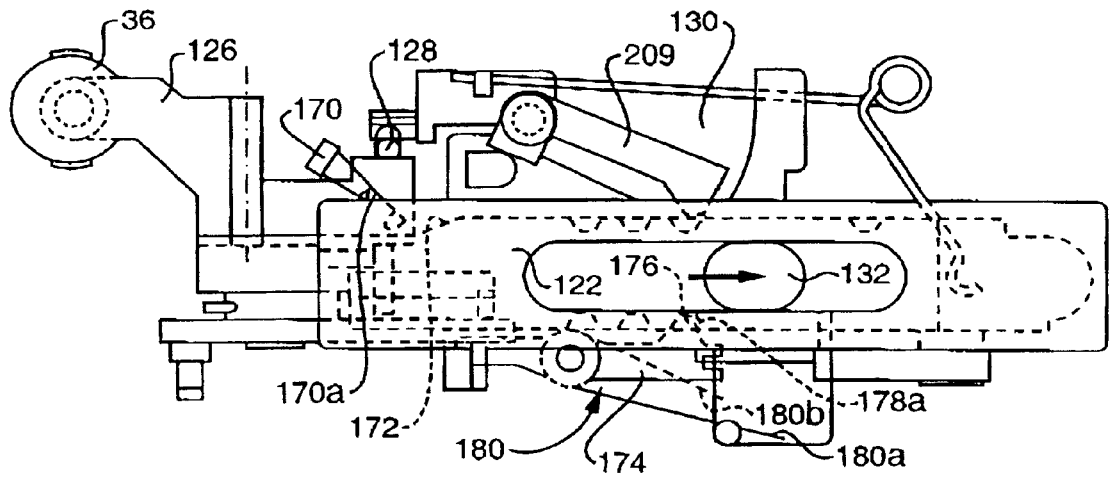
FIG. 13 is a plan view of the operating components of the aperture and shutter mechanism of the present invention in a still further different operating condition.

Reference is made to FIG. 13 for better illustrating how the strobe 112 is powered "on" in response to displacement of the slide 122. In this regard, a strobe power switch 170 connected to the strobe board 30 has an elongated spring arm 170a having a distal end biased into engagement with a side of the slide 122 to maintain the switch in an open or "off" condition as illustrated in FIGS. 7, 9 and 11. However, as the slide member 122 is moved to a first aperture setting position (FIG. 13) switch arm 170a follows a cam surface 172 onto a reduced width portion of the slide, thereby closing the switch and thus effecting energization of a strobe capacitor. Thus, the strobe will be energized during aperture select without the user having to make a conscious decision to use the strobe. It will be appreciated that the strobe will be fired in each of the aperture settings.

Figure 14:
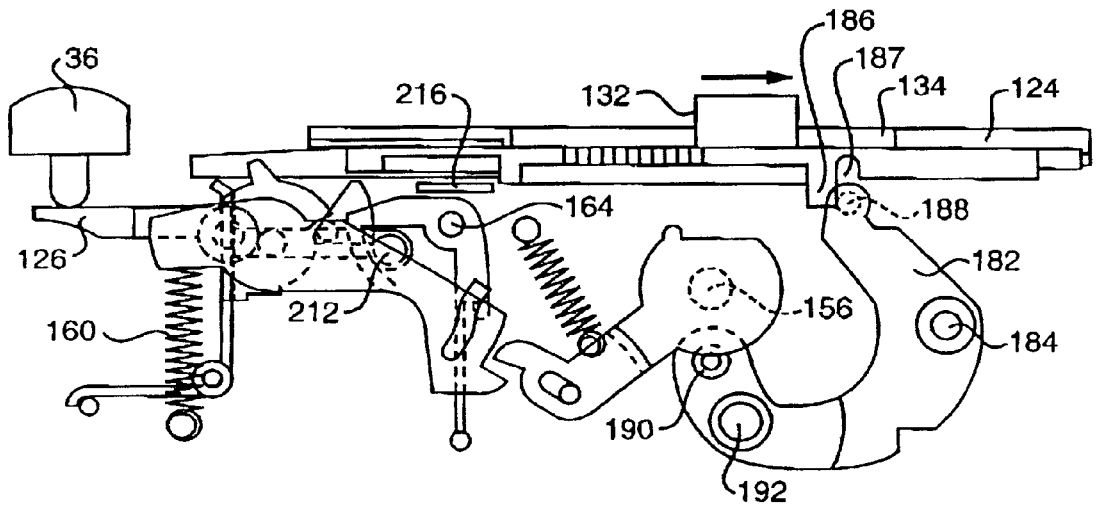
FIG. 14 is an elevation view of the components depicted in FIG. 13.

FIGS. 13 and 14 illustrate an arrangement of components wherein the slide 122 is detented in the first aperture setting condition. In this condition, a slide detent member 174 is pivotally mounted on the slide housing 124 and has a tapered distal end 176 that is urged into a first aperture setting detent notch 178a by a clasp spring 180. It will noted that the detent notch 178a corresponds to the "indoor" aperture setting. For effecting this detenting operation, a clasp spring 180 has an end 180a engaging a projection on the slide housing 124 and another end 180b engaging a surface of the detent member 174. The spring 180 urges the distal end 176 into the notch 178a when there is registration between the latter. However, it will be further noted that the clasping mechanism 130 is maintained out of engagement with the slide 122 during the aperture setting mode. It will be further noted that there are three notches 178a–c, each corresponding to one of the three aperture settings.

Figure 12:
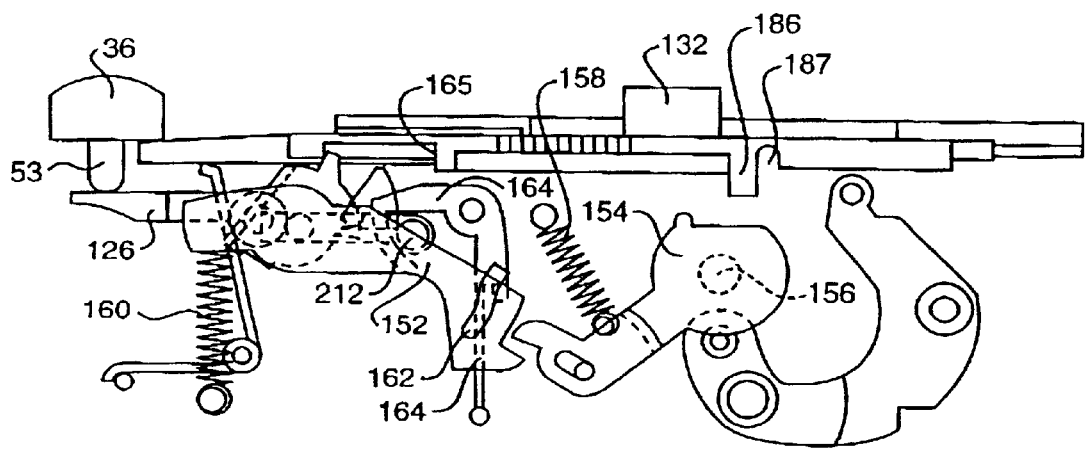
FIG. 12 is an elevation view of the components depicted in FIG. 11.

In the first aperture setting position shown in FIG. 12, it will be further noted that aperture plate 182 is pivotally mounted at 184 to the main frame assembly and remains out of an overlying relationship with the aperture 156, thereby not modulating incident scene light to the film plane during the indoor exposure.

Figure 15:
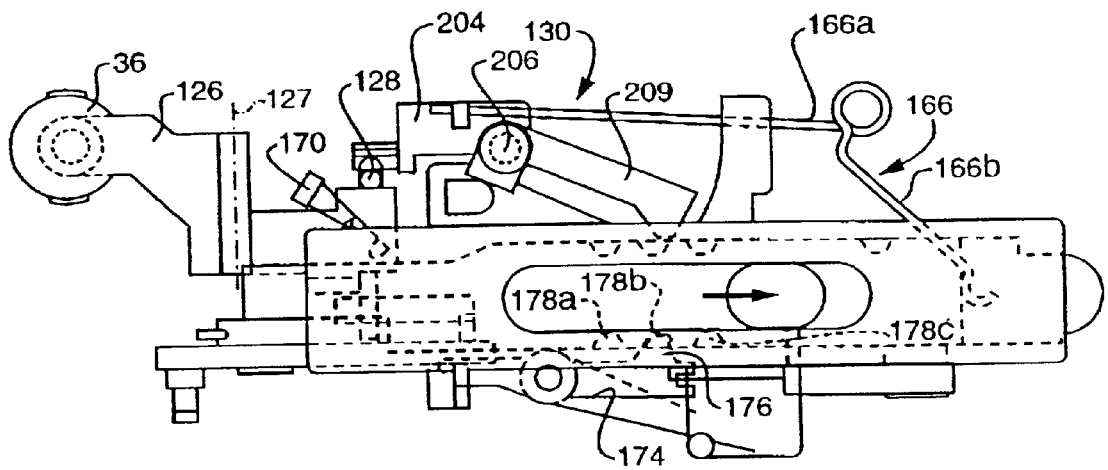
FIG. 15 is a plan view of the operating components of the aperture and shutter mechanism of the present invention in a still further different operating condition.
Figure 16:
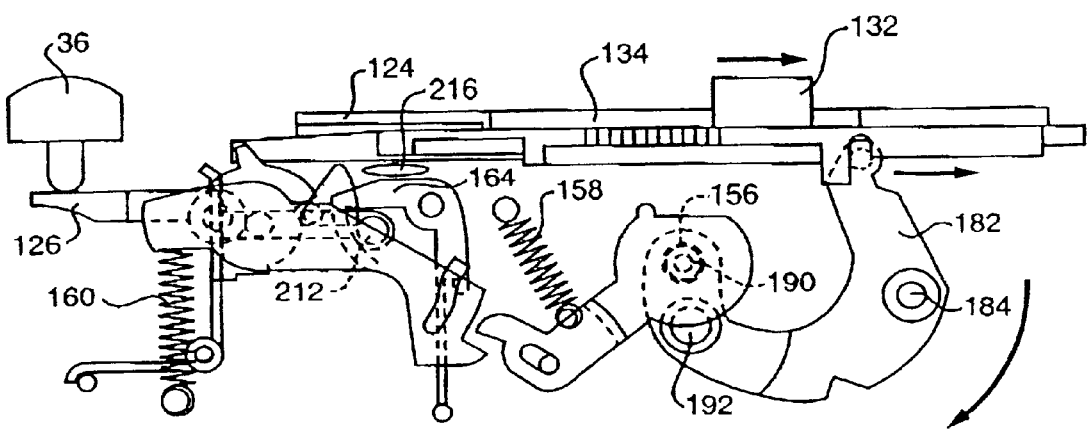
FIG. 16 is an elevation view of the components depicted in FIG. 15.

FIGS. 15 & 16 illustrate a second aperture setting position corresponding to a "sunny" scene condition. To reach this setting, an operator further displaces the slide 122 until the selector tab 40 is positioned adjacent the "sunny" iconographic setting on the camera. At this location, the distal end 176 engages the detent notch 178b under the influence of the spring 180. It will be understood that during sliding movement, a depending shoulder 186 of the slide 122 extends downwardly and into the path of an aperture plate pin 188. As the slide 122 is displaced, the shoulder 186 and an accompanying recess 187 trap the pin and effect rotation of the aperture plate so that an aperture 190, corresponding to an appropriate f-number for "sunny" conditions, is in optical alignment with the exposure aperture 156. The aperture plate 182 is positively locked into an overlying optical registry with the exposure aperture 156.

Figure 17:
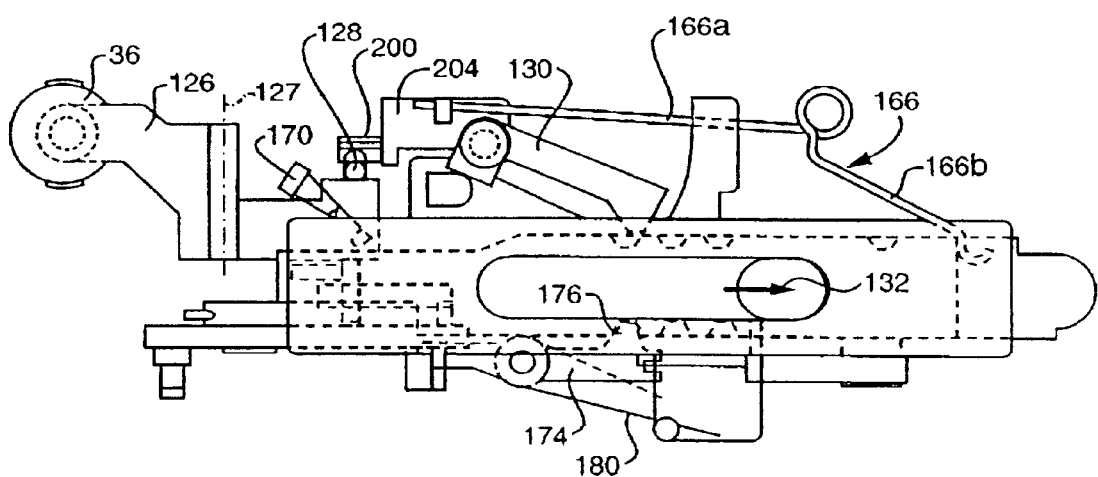
FIG. 17 is a plan view of the operating components of the aperture and shutter mechanism of the present invention in a still further different operating condition.
Figure 18:
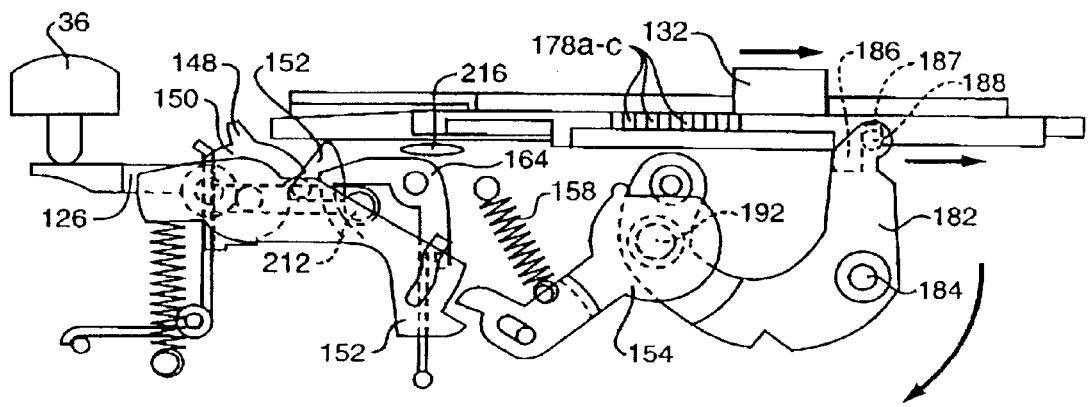
FIG. 18 is an elevation view of the components depicted in FIG. 17.

FIGS. 17 & 18 illustrate the components when the aperture select mechanism 120 is in its third aperture setting condition corresponding to, for example, "partly sunny" conditions, whereby an aperture 192 on the plate is in alignment with the exposure aperture 156. The aperture 192 is set when the slide 122 and its depending shoulder 186 drive rotatably the aperture plate 182 until the distal end 176 of the slide detent 174 is driven into engagement with detent notch 178c and thus resist movement of the slide 122. The aperture 192 has an appropriate f-number that corresponds to a so-called "partly sunny" scene condition.

Figure 19:
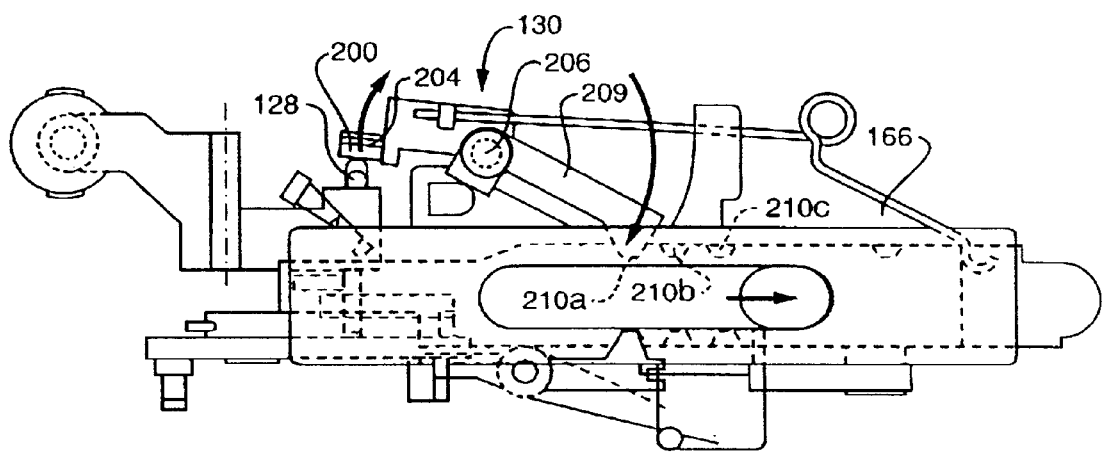
FIG. 19 is a plan view of the operating components in another view.
Figure 21:
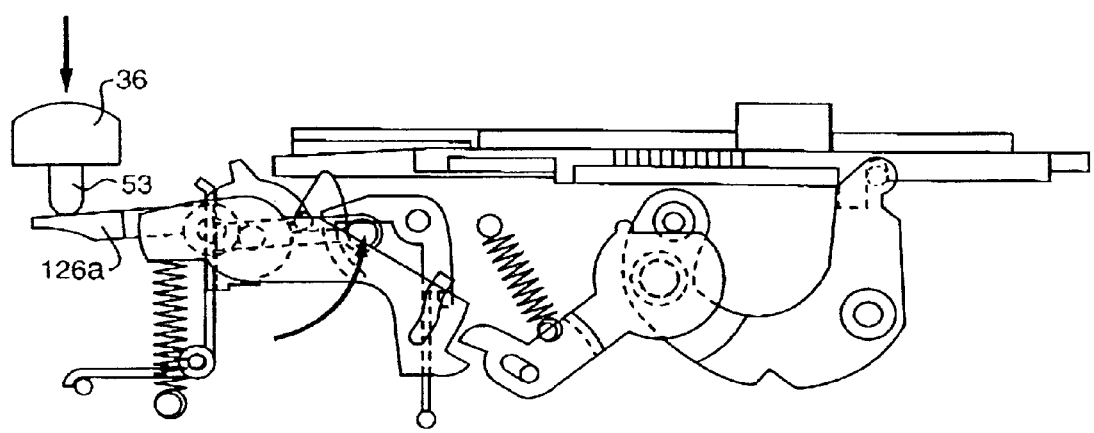
FIG. 21 is an elevation view of the components depicted in FIG. 19.
Figure 20A:
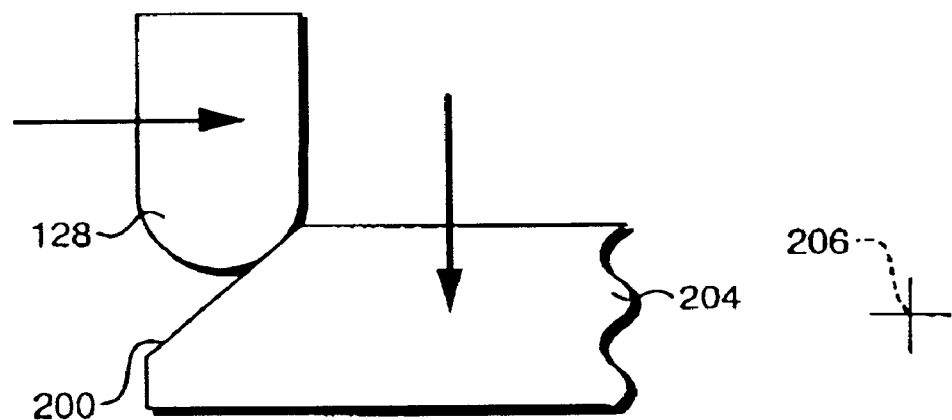
FIG. 20A is an enlarged partial view of the cooperation between a cam and clasping portion.
Figure 20B:
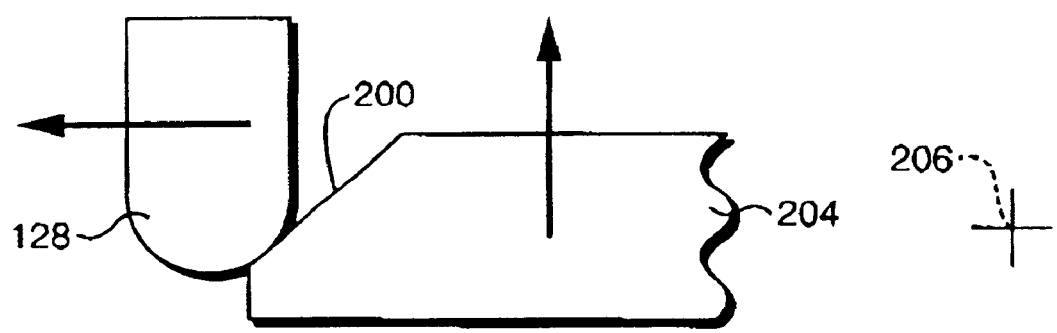
FIG. 20B is an enlarged partial view of the cooperation between the components of FIG. 19A.
Figure 22:
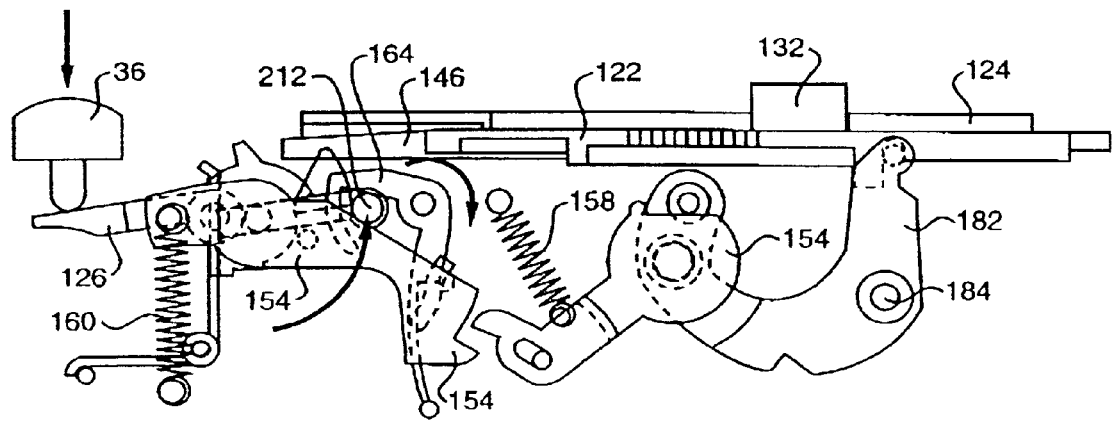
FIG. 22 is an elevation view of the operating components of the aperture and shutter mechanism of the present invention wherein the shutter post forces a hammer latch to release the hammer for initiating an exposure.
Figure 23:
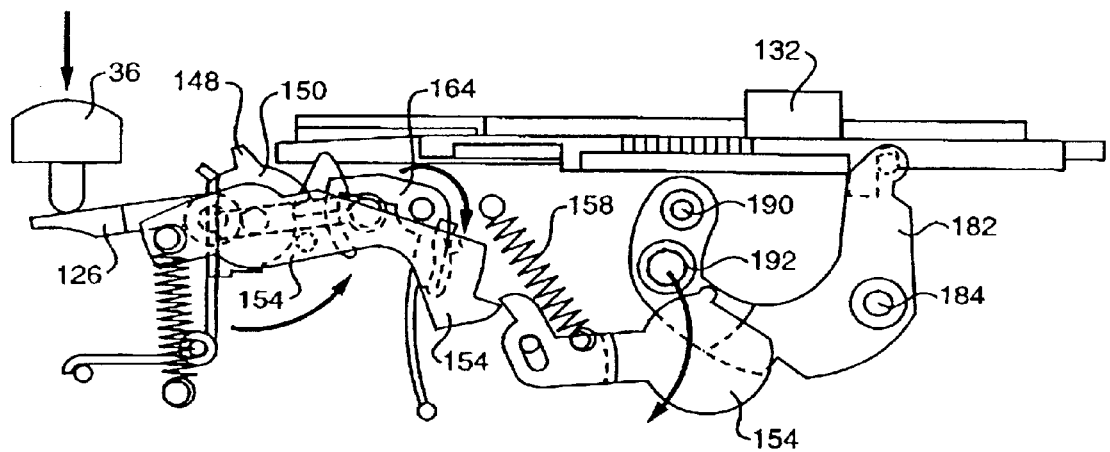
FIG. 23 an elevation view of some components illustrated in FIG. 22.
Figure 24:
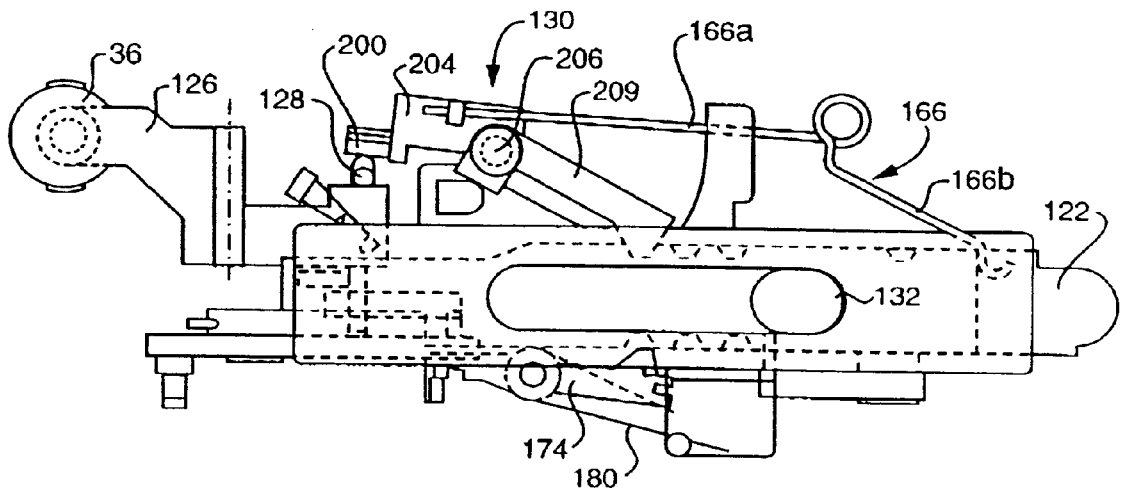
FIG. 24 is a plan view illustrating the hammer pivoting an aperture slide detent out of engagement, and triggering a strobe fire switch.
Figure 25:
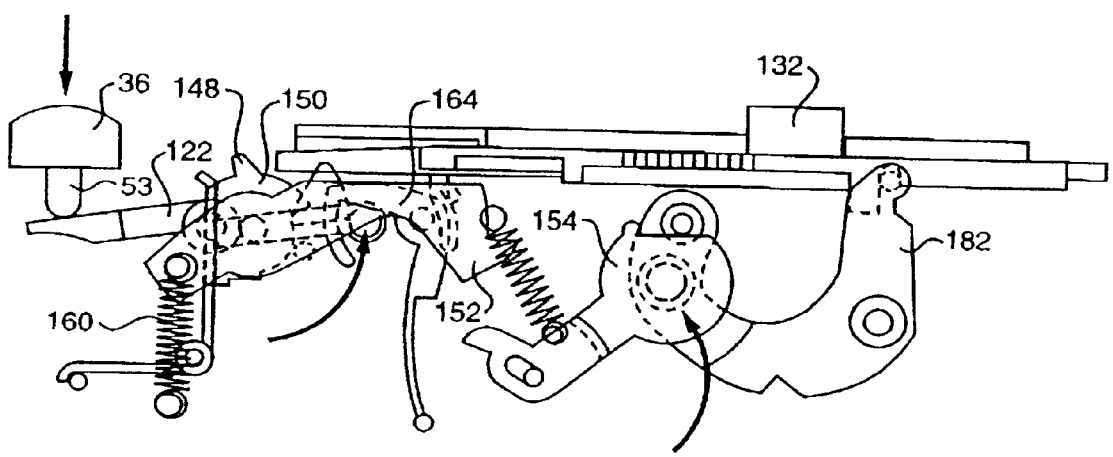
FIG. 25 is an elevation view of the components depicted in FIG. 24.

FIGS. 19 & 21 illustrate a shutter actuating procedure and, in particular, the positioning of several components following the shutter button 36 being depressed by an operator. In such a position, the shutter link 126 has been pivoted upwardly and effects swinging movement of the clasping mechanism 130 from an inoperative position to an operative or clasping position (FIG. 19). In particular, the cam 128 while pivoted upwardly rides on and drives an inclined surface 200 about 45 degrees with respect to a vertical plane on a clasping arm portion 204 of the clasping mechanism 130 about a vertical axis 206; whereby a distal end 208 of a clasping arm 209 engages a notch 210a formed on a side of the slide 122; thereby retaining the latter until the clasping mechanism 130 is released in a manner to be described. It will be noted that the slide 122 includes a series of detent notches 210a–c corresponding in position with the detent notches 178a–c so that the clasping mechanism holds the slide until it is by an operator releasing the shutter button.

Referring back to the shutter link 126, its upward movement drives a link pin 212 that engages and moves the hammer latch 164 so as to release the hammer 152, whereby the latter is rotated upwardly by the hammer spring 160 to trip the shutter 154 to commence opening of the shutter aperture 156. The shutter 154 will then be driven back to its closed position, thereby terminating exposure by the shutter return spring 158. As the hammer 152 moves to its upward position, a cam 214 carried thereby engages a strobe fire switch 216 that depends from the strobe board for firing the strobe during the time that the shutter allows scene light to the film plane through the aperture 156. It will be appreciated that the hammer 152 remains in its upward position until it is recocked.

Figure 26A:
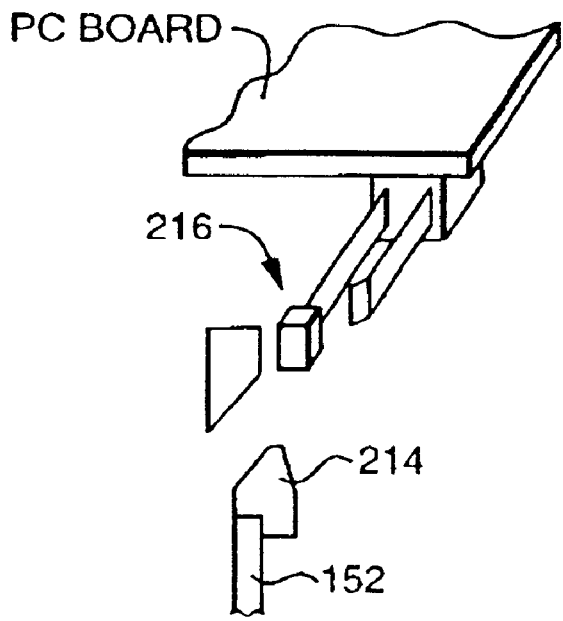
FIGS. 26A and 26B illustrate operation of the strobe fire switch during movement of the hammer depicted in FIGS. 24 and 25.
Figure 26B:
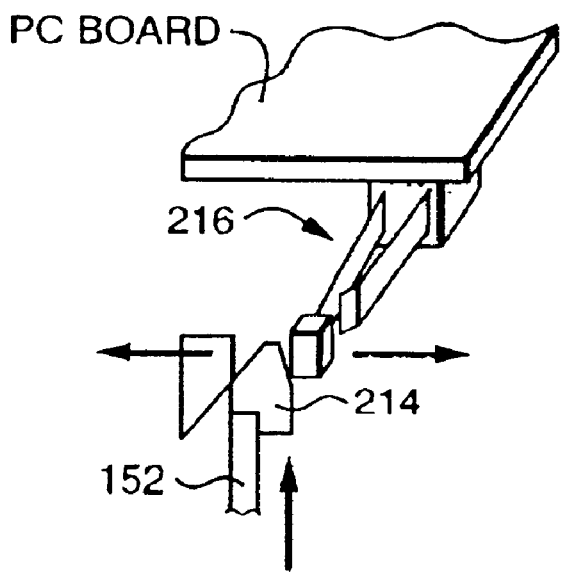

FIGS. 24, 25, 26A & 26B illustrate that the cam 214 on the hammer drives the detent arm 174 out of engagement with a respective one of the notches 178a–c generally simultaneously as the strobe fire switch is closed (FIGS. 26A, 26B). However, the slide 122 remains stationary because of the clasping arm 209 retaining the slide in place until released by the operator in a manner to be described.

Figure 27:
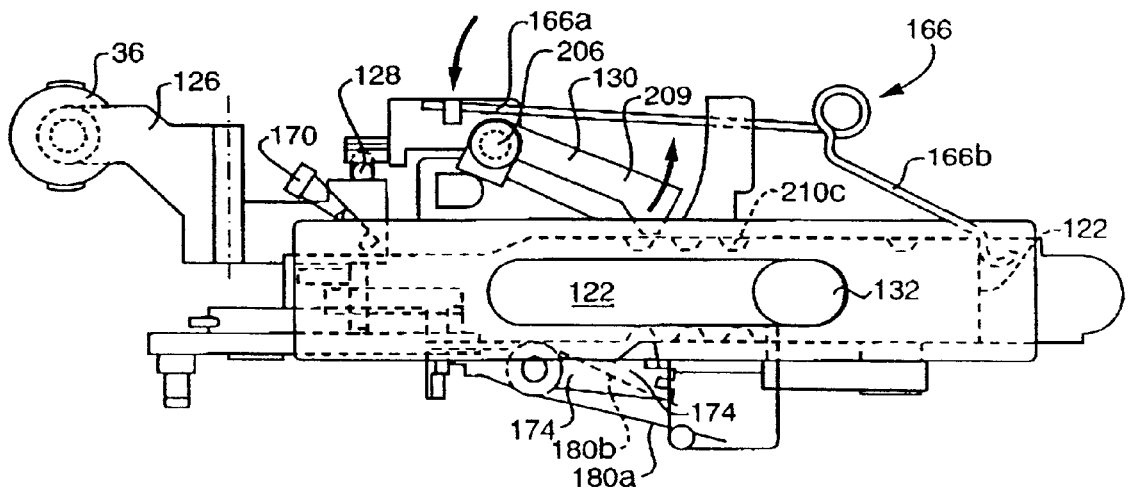
FIG. 27 is a plan view of the operating components of the aperture and shutter mechanism of the present invention wherein the shutter button is released and a clasp moves out of a detent.
Figure 28:
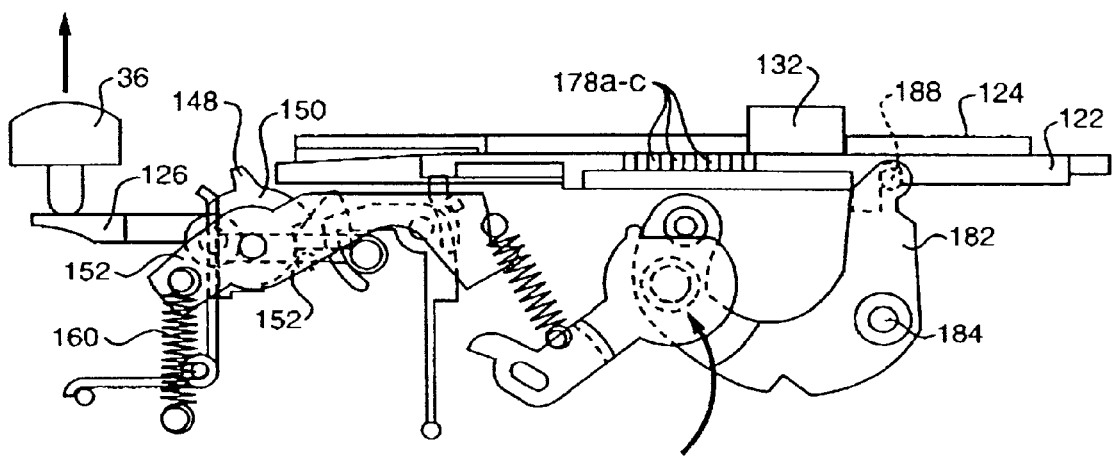
FIG. 28 is an elevation view of the components depicted in FIG. 27.
Figure 29:
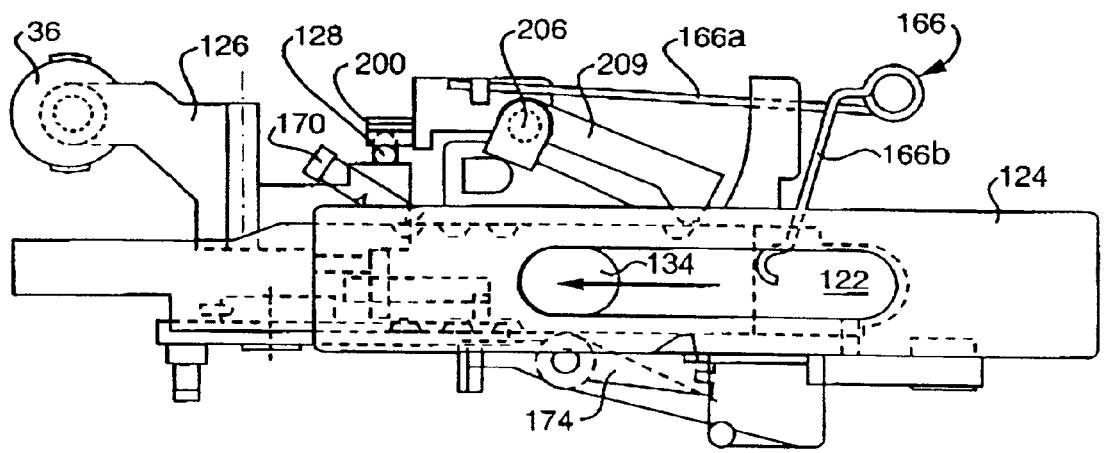
FIG. 29 is a plan view of the operating components of the aperture and shutter mechanism of the present invention with the slide selector being forced back to the original "off" position.
Figure 30:
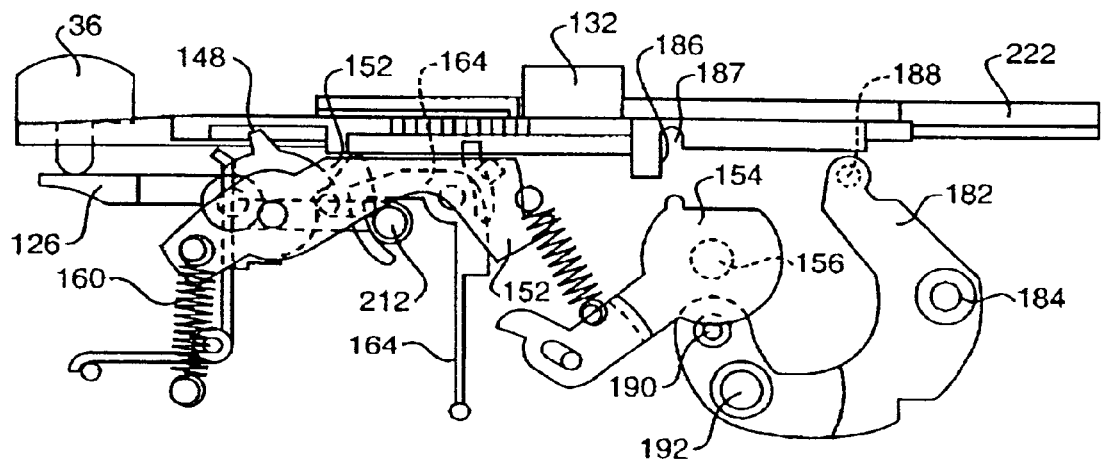
FIG. 30 is an elevation view of the components depicted in FIG. 29.

FIGS. 27 and 28 illustrate release of the clasping arm 209 upon release of the shutter button 36 by the operator, thereby freeing the slide to return to the original position under the urging of the clasp spring 166. Because of a spring (not shown) the shutter link 122 is rotated back to its original position about axis 127 upon release of operator pressure. As this occurs, the cam 128 moves downwardly. It will be realized that an arm 166a of the clasp spring 166 engages the arm 204 portion beyond the axis 206 and retains engagement with the cam 128 such that as the cam is rotated the arm 209 is thereby rotated in a counterclockwise direction to remove the distal end 208 from one of the notches 210a. Owing to the clasp spring portion 166b engaging the slide 122, the latter is returned automatically to the opposite end of the slot whereby the button engages the retainer housing to retain the slide in its original "off" condition (FIGS. 29 & 30)

Figure 31:
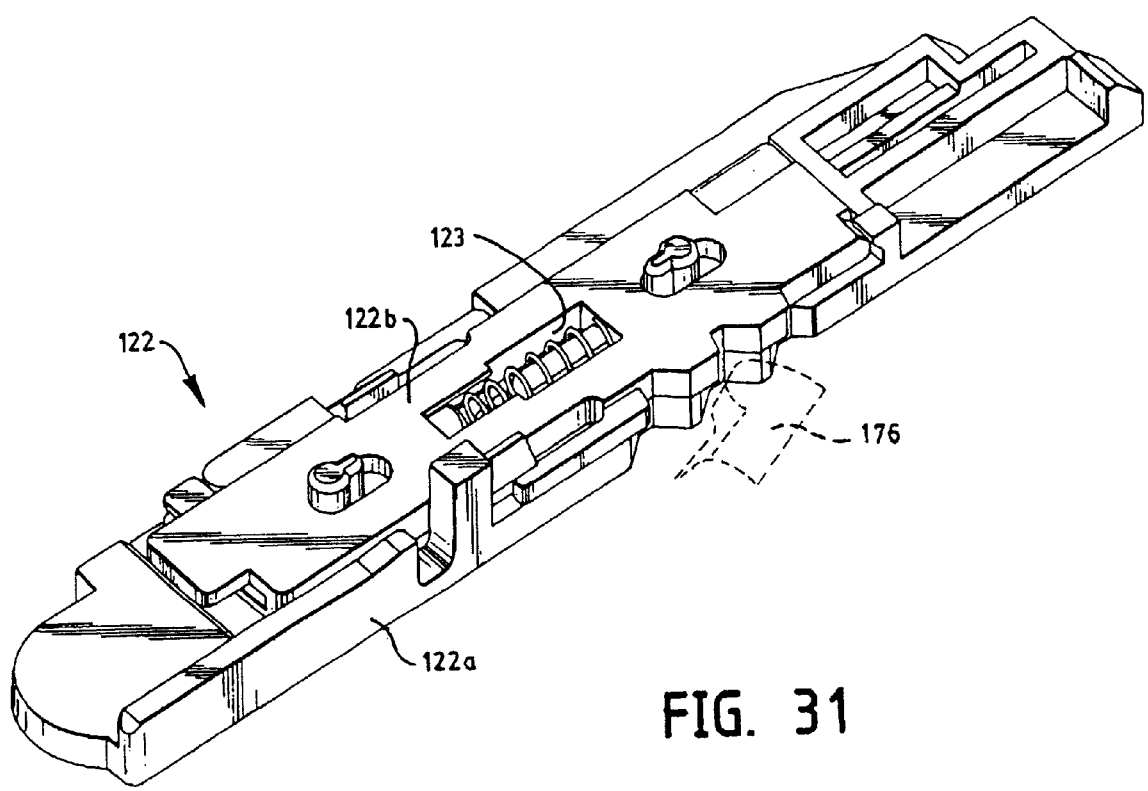
FIG. 31 is a perspective view of the aperture selector of the present invention.

FIG. 31 illustrates a bottom view of the aperture selector slide 122 which includes a main slide portion 122a that is interconnected to and relatively movable with respect to a stop element 122b by virtue of a spring 123 for allowing the slide portion and the stop element to mfove relative to each other for purposes made apparent. It will be appreciated that the notches are generally aligned in both the main slide portion and the stop element. In this embodiment, the clasp engages the notches in the stop element 122b and not necessarily the main slide portion 122a; wherein the stop element is actually spring biased by the clasp spring 166 (not shown). Because of this construction and arrangement, a user can easily and reliably manually return the aperture slide 122 to its original or "off" position; after the slide has been moved to one of the aperture setting conditions. In particular, when the user moves the main portion 122a its notches will move relative the stop element that has received in detenting relationship the clasp. Owing to the relative movement the notches of the main portion will force the clasp from the notches of the stop element thereby allowing the user to return the slide to its original position if the operator decides not to take a picture.

It will be appreciated that changes may be made in the above structure and process without departing from the scope of the invention described herein. It is intended that all matter contained in the above description or shown in the accompanying drawings shall be interpreted in an illustrative and not in a limiting sense. Thus, other alternatives and modifications will now become apparent without departing from the spirit and scope of the invention.

What is claimed is:

1. A camera, comprising:
    a shutter mechanism having a shutter blade that is spring biased by a shutter spring, said shutter mechanism including portions thereof moveable between an initial rest position and a cocked position wherein said shutter spring is releasably held in a force delivery configuration in preparation for its release to move said shutter blade during a photographic exposure operation upon actuation of said shutter mechanism;
    an actuating means for actuating said shutter mechanism; and
    an aperture selecting assembly coupled to said shutter mechanism, including an aperture selector slide, wherein said slide is movably displaceable by an operator from an initial aperture setting to one of a plurality of aperture sittings, and wherein said displacement of said slide causes said slide to directly engage and move said movable portions of said shutter mechanism from said initial rest position to said cocked position to cocked said shutter mechanism in preparation for a photographic exposure operation.

2. The camera of claim 1 further comprising a strobe, wherein said displacement of said slide energizes said strobe.

3. The camera of claim 1 further comprising a first clasping device and a second clasping device, wherein at a desire aperture setting said selector slide is detented by said first clasping device, wherein said second clasping device becomes operative during shutter actuation, wherein said first clasping device is released by said shutter actuator, and wherein said second clasping device retains said desired aperture setting until termination of shutter operation.

4. The camera of claim 1, wherein said slide is mounted on tracks that facilitate reciprocal movement of said slide.

5. The camera of claim 1 further comprising an elongated slot, wherein said slide traverses said slot in an axial direction.

6. The camera of claim 1 further comprising a protruding element and an aperture selector plate, wherein said protruding element cooperates with said aperture selector plate allowing an operator to displace said slide from an initial aperture setting to one of a plurality of aperture settings.

7. The camera of claim 1, wherein said aperture setting is selected from the group consisting of: indoor, sunny, and partly cloudy.

8. The camera of claim 1, wherein said aperture selecting assembly further comprises:
    a selector stopper having at least on detented surface;
    a clasper, wherein said clasper engages said selector stopper such that the angle of engagement facilitates locking of a camera aperture against a spring return force; and
    an aperture selector having at least one cam surface, wherein the manual return of said aperture selector is facilitated by disengaging said aperture selector from said clasper, and wherein said aperture selector is connected to said selector stopper.

9. A method for providing and storing energy in a hammer spring for operating a camera shutter, comprising the steps of:
    providing a camera having an aperture selector slide which is movably displaceable to one of plurality of aperture settings by an operator;
    providing a hammer in said camera, wherein said hammer is connected to said hammer spring, and wherein said hammer cooperates with said slide; and
    displacing said slide from an initial aperture setting to a first aperture setting by said operator, wherein said hammer is rotationally displaced thereby stretching said hammer spring thus effecting the generation and storage of energy in said spring for operating said camera shutter.

10. A camera, comprising:
    a shutter mechanism having a shutter blade that is spring biased by a shutter spring;
    an actuating means for actuating said shutter mechanism;
    an aperture selecting assembly coupled to said actuating means, including an aperture selector slide, wherein said slide is movably displaceable by an operator from an initial aperture setting to one of a plurality of aperture settings, and wherein said displacement of said slide energizes said shutter; and
    a rotatable hammer bypass device, wherein an operator returns said aperture setting to an initial aperture setting from a second aperture setting without actuating said shutter.

* * * * *